UNITED STATES PATENT OFFICE.

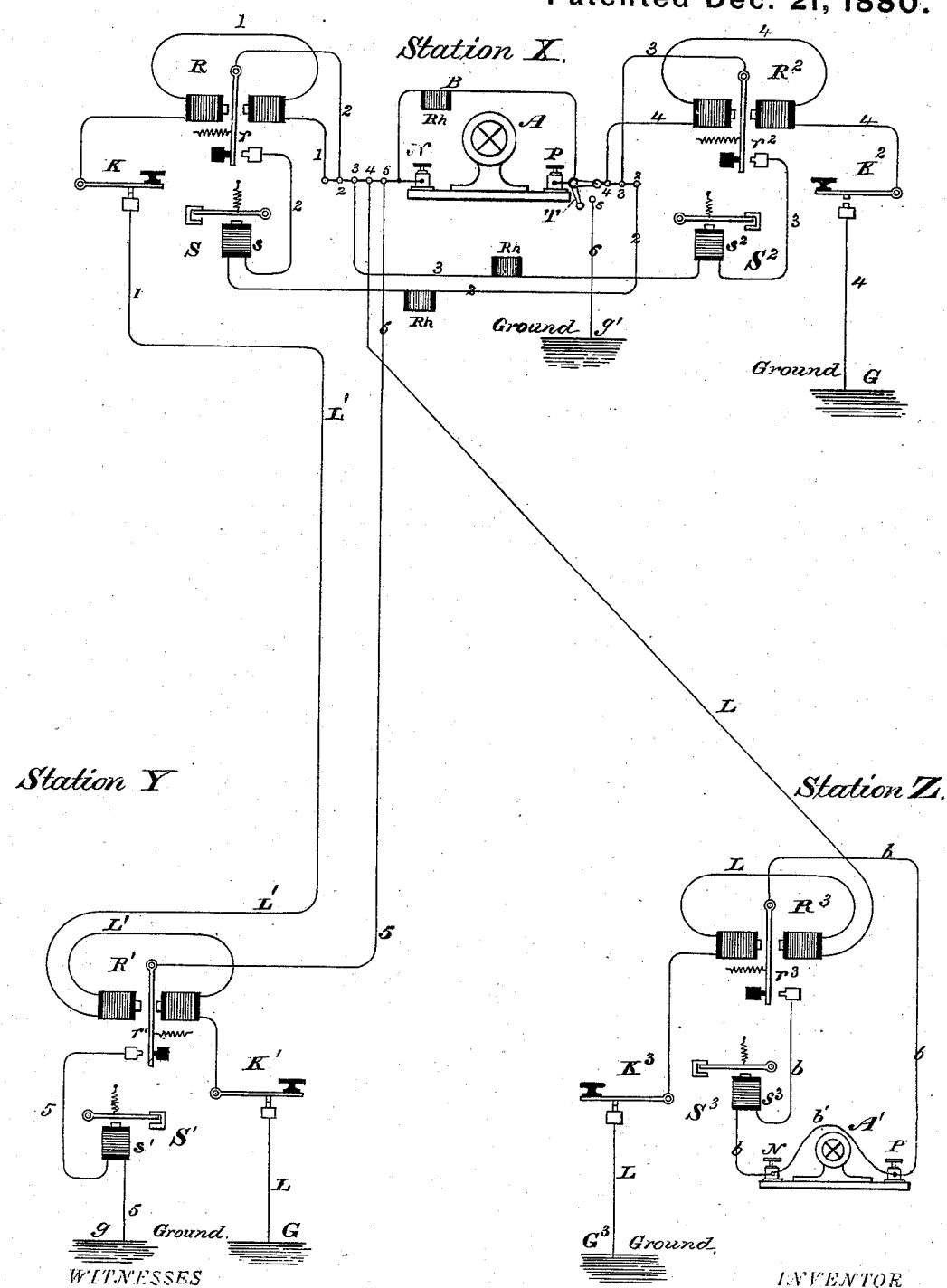

ORAZIO LUGO, OF NEW YORK, N. Y.

DYNAMO-ELECTRIC TELEGRAPHY.

SPECIFICATION forming part of Letters Patent No. 235,689, dated December 21, 1880.

Application filed September 25, 1880. (No model.)

*To all whom it may concern:*

Be it known that I, ORAZIO LUGO, a citizen of the United States, residing in the city, county, and State of New York, have invented certain new and useful Improvements in Dynamo-Electric Telegraphy, of which the following is a specification.

My invention relates to that class of electric telegraphs in which dynamo-electricity is employed in the transmission of signals, instead of voltaic electricity generated by chemical action.

The methods of working my improved system and apparatus therefor are fully set forth and claimed in other applications now pending, and the claims of this application are accordingly limited to the specific organization of apparatus set forth at the end of this specification.

The essential elements of my improved organization are a dynamo-electric machine or generator of any of the well-known and improved forms of construction, a shunt-wire or short circuit connecting the opposite poles of the armatures thereof, an electric or telegraphic circuit or circuits connected with the poles of said armatures, signaling apparatus of well-known construction in said circuit, and a local sounder in a branch circuit separate from the main line and shunt wire.

The accompanying drawing represents a diagram of the organization of apparatus embodying my invention. The details of the apparatus shown, as well as the arrangement of such apparatus with reference to the circuits, may, however, be modified in various ways without departing from the principle of my invention. In this instance three stations are shown—a main or central station, X, and two terminal stations, Y and Z.

The organization shown is well adapted for lines of ordinary length. For long circuits, however, it would be preferable to place a generator at each end of the line, taking care that their respective unlike poles are presented to the line. The running of the circuits under my improved system is substantially the same as that used where voltaic or chemical batteries are employed—that is to say, the proper relative polarities of the apparatus must be maintained throughout. The instruments of a large number of stations under this organization may be operated from a single generator.

In the accompanying drawing, A represents a dynamo-electric generator, which may be of any suitable well-known construction, and driven by a power in the usual manner. The opposite poles, N P, of the generator are connected by a shunt-wire, B, in which an adjustable rheostat or resistance-coil, R$h$, is included. This adjustability is for the purpose of giving the shunt the proper resistance relatively to the generator. As an example of the proper relative resistance between the generator and shunt, a resistance in the latter of from five to six ohms is sufficient for a generator having an electro-motive force or generative capacity of fifty volts, such an apparatus being adapted to operate a line of from five hundred to six hundred miles in length, besides supplying the necessary branch circuits or derived currents to operate the local sounders. The rheostat could obviously be dispensed with by experimentally adjusting the shunt-wire to the proper relative resistance. As another extreme example with an electromotive force derived from a machine of low intensity with a capacity of one volt, a resistance in the shunt of about one-thousandth of an ohm is required.

Telegraphic circuits or line-wires 1, 2, 3, 4, and 5 are shown as connected with the poles N P of the generator in the ordinary way of running branch telegraphic circuits, those delineated in the drawing being known as "ordinary normally-closed earth-circuits," included in which circuits are ordinary telegraph-keys K K' K'' K''', relays R R' R'' R''', sounders S S' S'' S''', adjustable rheostats R$h$ being included in the line-wire wherever required to equalize the resistance of the circuits.

Under the organization shown the south pole P is the positive pole. Starting from the ground G, at the home or central station, X, a telegraphic circuit is shown as running through the wire 4, key K'', relay R'', generator A at P, through the field-magnets and armatures of the generator, to the binding-post of the pole N, which post forms a common branching point for all the lines, any one of which may be followed—for instance, through the line 4 and main line L to the station Z, where it passes through relay R''' and key K''' to the ground G''', which is the ground of opposite polarity of that from which the circuit started.

A local sounder, S'', at the central station, X, is located in a local metallic circuit, 3, starting again from a connection with the south pole P of the generator, running through the tongue r'' of the relay R'', and through its contacts to the helix s'' of the sounder S'', thence through a rheostat, $Rh$, to the point 3 on the north side of the generator, and through the machine to its starting-point. The corresponding sounder S''' at the terminal station Z is also in a local metallic circuit, b, starting from the south pole P of the generator A', running through the line b, tongue r''', and the contact-points to the helix s''' of the sounder S''', thence to the north pole of the generator A' at that station, and through the generator to the starting-point. This generator is also provided with a shunt or short circuit, b', connecting its poles. Under this organization it will be observed that the receiving-instrument Z is actuated by an independent generator included in its local circuit. This plan of including the sounder at the terminal station in a local metallic circuit provided with an independent generator is preferable for very long distances, although the plan shown for working the locals by branch circuit from the main generator answers very well for circuits of ordinary length.

I will now proceed to describe the circuit-connections between the home station X and station Y, which are as follows: Starting from the same ground, G, as before, the circuit passes through the wire 4, key K'', and relay R'', to the south pole P of the generator, thence through the generator to the north pole N, thence out of the line 1, through relay R and key K, to the line L', relay R', and key K', to the ground G' at that station. The corresponding local sounder at the home station is included in a closed metallic circuit starting from the south pole of the generator, through the machine, through the line 2, the tongue r of the relay R, its contact-point, and the helix s of the sounder S, back to the starting-point. The local sounder at the terminal station Y is operated by a separate line-wire or telegraphic circuit, 5, the connections of which are as follows: starting from the common ground G, through the wire 4, key K'', relay R'', through the generator and wire 5 to the tongue r'' of the relay R', thence through its contact-point and helix s' of the sounder S' to a separate ground, g.

In case it is desired to cut out the key K'', its relay R'', and sounder S'', the switch T is turned so as to connect the wire 6 with the generator without disturbing their circuit-connections, the effect of which is to ground the line at the point g', instead of at the common ground G, thus shunting the key K'' and its ground. The organization shown is that of a normally-closed earth-circuit, through which the current constantly flows; but an open circuit may be used, if preferred. When used as a closed circuit no current passes through the line as long as the keys remain open, but the circuit passes through the generator and shunt. The resistance of the shunt being greater than that of the internal resistance of the machine, the shunt-wire becomes hot, while the machine remains cool—an incidental advantage of much importance, as is well understood. When a transmitting-key is closed, a portion of the charge from the machine passes over the main line, the effect of which is to increase the electro-motive force of the generator, thus automatically and correlatively adapting the electro-motive force of the machine to the work to be done.

Experience has demonstrated that an apparatus organized as above described affords a smooth regular current, by means of which signals may be transmitted with great efficiency.

The operation of the apparatus will readily be understood from the foregoing description. The details of construction and operation of the apparatus are, however, more fully set forth in the other divisions of this application, hereinbefore referred to.

Under the organization of apparatus shown the working of the key K operates the receiving-instrument at station Y only; but when the switch T is open and the key K'' is worked, it operates not only its own receiving-instrument and the corresponding instrument S at the home station, but also the receivers at both the terminal stations Y and Z. In the diagram the switch T at station X is shown as open; but this does not break the continuity of the circuit from the key K'' through the point 4 to the south pole S of the generator. When the switch T is closed it connects the generator through line 6 to ground, which closing shunts or short-circuits said key without breaking its circuit.

I claim as of my own invention—

The combination, substantially as herein set forth, of a dynamo-electric machine or generator, a constantly-closed shunt-circuit connecting its opposite poles, one or more telegraphic circuits included in branch circuit with the generator, apparatus for producing intelligible signals on the line, and a local sounder in branch circuit with the shunt-circuit and telegraphic circuits.

In testimony whereof I have hereunto subscribed my name this 23d day of September, A. D. 1880.

ORAZIO LUGO.

Witnesses:
WM. J. PEYTON,
NELLIE L. HOLMES.